US008754887B2

(12) United States Patent
Kuffner, Jr. et al.

(10) Patent No.: US 8,754,887 B2
(45) Date of Patent: Jun. 17, 2014

(54) DETERMINING THREE-DIMENSIONAL (3D) OBJECT DATA MODELS BASED ON OBJECT MOVEMENT

(75) Inventors: James J. Kuffner, Jr., Mountain View, CA (US); Anthony Gerald Francis, Jr., San Jose, CA (US); Arshan Poursohi, Berkeley, CA (US); James R. Bruce, Sunnyvale, CA (US); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 13/595,766

(22) Filed: Aug. 27, 2012

(65) Prior Publication Data
US 2014/0022248 A1    Jan. 23, 2014

Related U.S. Application Data

(60) Provisional application No. 61/674,140, filed on Jul. 20, 2012.

(51) Int. Cl.
*G06T 17/20* (2006.01)
*G06T 19/00* (2011.01)
*G06T 17/00* (2006.01)
*G06T 17/10* (2006.01)
*G06T 17/05* (2011.01)

(52) U.S. Cl.
USPC ............ 345/420; 345/419; 345/473; 345/474

(58) Field of Classification Search
None
See application file for complete search history.

(56) References Cited

U.S. PATENT DOCUMENTS

| | | | | | |
|---|---|---|---|---|---|
| 5,598,515 | A | * | 1/1997 | Shashua | 345/422 |
| 5,617,520 | A | * | 4/1997 | Yamada et al. | 345/419 |
| 5,633,995 | A | * | 5/1997 | McClain | 345/419 |
| 5,850,469 | A | * | 12/1998 | Martin et al. | 382/154 |
| 6,201,541 | B1 | * | 3/2001 | Shalom et al. | 345/419 |
| 6,970,591 | B1 | * | 11/2005 | Lyons et al. | 382/154 |
| 7,221,809 | B2 | * | 5/2007 | Geng | 382/280 |
| 7,605,817 | B2 | * | 10/2009 | Zhang et al. | 345/473 |
| 8,265,376 | B2 | * | 9/2012 | Tsuk et al. | 382/154 |
| 2003/0034971 | A1 | * | 2/2003 | Fujiwara et al. | 345/420 |

(Continued)

OTHER PUBLICATIONS

AutoCAD and AutoCAD LT All-In-One Desk Reference for Dummies, David Byrnes, p. 316.*

(Continued)

*Primary Examiner* — David Zarka
*Assistant Examiner* — Jason Pringle-Parker
(74) *Attorney, Agent, or Firm* — McDonnell Boehnen Hulbert & Berghoff LLP

(57) ABSTRACT

Methods and systems for determining three-dimensional (3D) object data models of an object based on movement of the object. A processor may receive first scan data and second scan data of an object within in a space. The first scan data may comprise a first position of the object in the space and a first mesh image defining a first view of a shape of the object at the first position. The second scan data may comprise movement information defining a movement of the object from the first position to a second position within the space and a second mesh image defining a second view of the shape of the object at the second position. The first scan data and the second scan data may be aligned to generate a 3D object data model based on the first mesh image, the movement information, and the second mesh image.

15 Claims, 7 Drawing Sheets

(56) References Cited

U.S. PATENT DOCUMENTS

| | | |
|---|---|---|
| 2003/0063086 A1 | 4/2003 | Baumberg |
| 2008/0112610 A1 | 5/2008 | Israelsen et al. |
| 2009/0002364 A1* | 1/2009 | Witte, II .................... 345/419 |
| 2012/0176478 A1 | 7/2012 | Wang et al. |
| 2012/0177283 A1* | 7/2012 | Wang et al. ................. 382/154 |

OTHER PUBLICATIONS

Autodesk 123D Catch, Catch and carry, Turn ordinary photos into extraordinary 3D models, www.123dapp.com/catch, 2013.

Brown et al: "Non-rigid range-scan alignment using thin-plate splines", 3D Data Processing, Visualization and Transmission, 2004. 3DPVT 2004. Proceedings. 2nd International Symposium on Thessaloniki, Greece Sep. 6-9, 2004, Piscataway, NJ, USA, IEEE, Sep. 6, 2004, pp. 759-765, XP010725529, DOI: 10.1109/TDPVT.2004.1335392 ISBN: 97S-0-7695-2223-4.

Synave et al: "Automated Trimmed Iterative Closest Point Algorithm", Nov. 26, 2007, Advances in Visual Computing; [Lecture Notes in Computer Science], Springer Berlin Heidelberg, Berlin, Heidelberg, p. 489-498, XP019083447, ISBN: 978-3-540-76855-5.

International Search Report for corresponding international application No. PCT/US2013/043844 mailed Jul. 30, 2013.

Written Opinion for corresponding international application No. PCT/US2013/043844 mailed Jul. 30, 2013.

\* cited by examiner

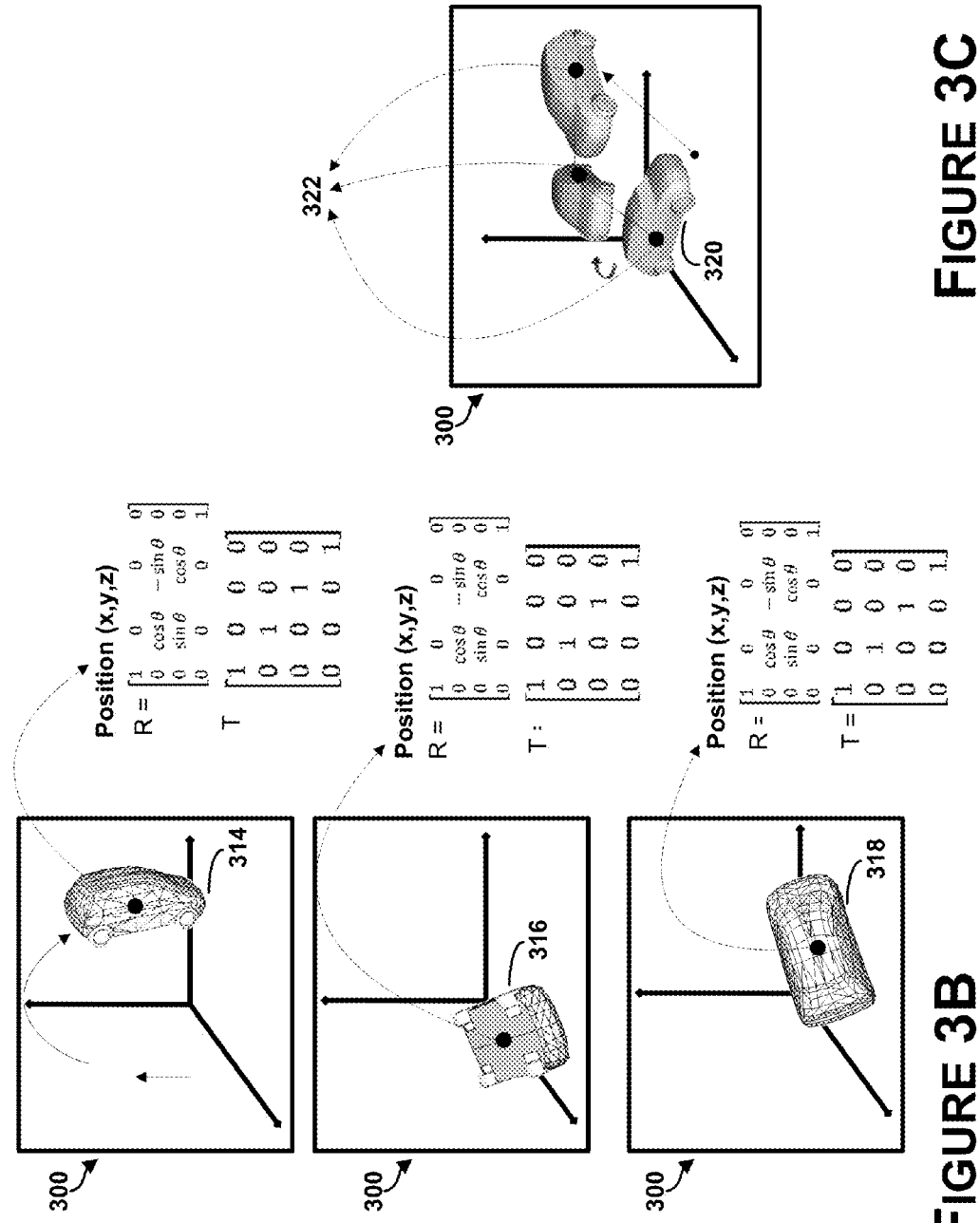

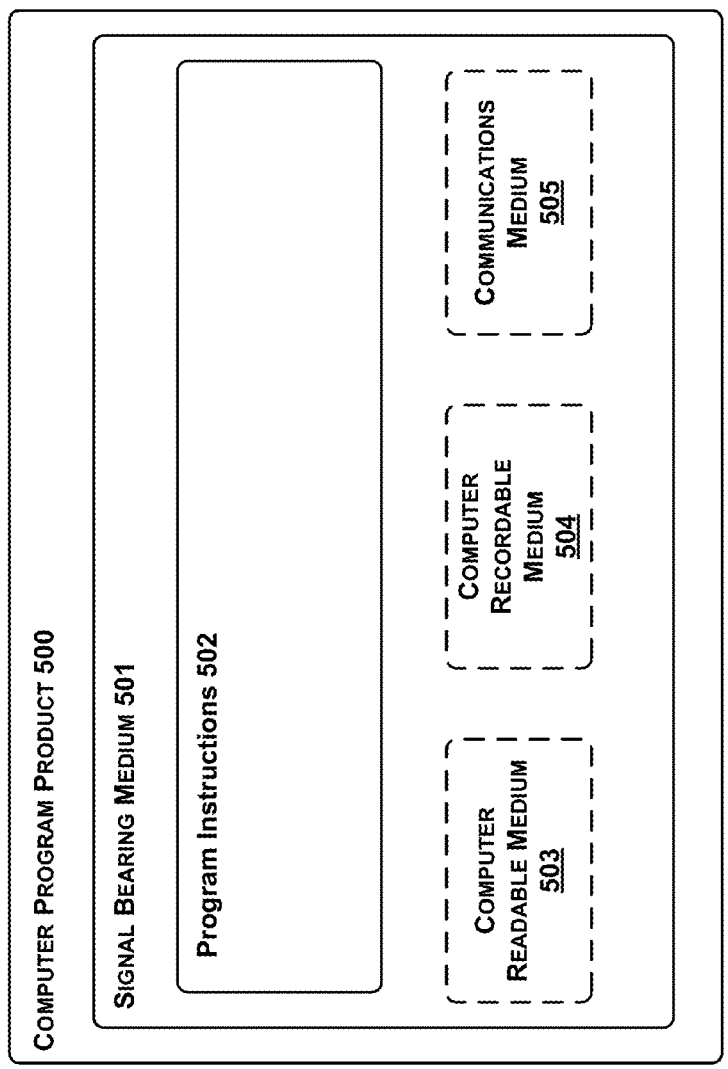

DETERMINING THREE-DIMENSIONAL (3D) OBJECT DATA MODELS BASED ON OBJECT MOVEMENT

CROSS-REFERENCE TO RELATED APPLICATIONS

The present non-provisional utility application claims priority under 35 U.S.C. §119(e) to provisional application number U.S. 61/674,140 filed on Jul. 20, 2012, the entire contents of which are herein incorporated by reference.

FIELD

The present disclosure relates to three-dimensional (3D) object data modeling, and for example, to methods for determining a 3D object data model.

BACKGROUND

Three-dimensional (3D) scanning and digitization of objects is commonly used in many industries and services and their applications are numerous. A few examples include 3D inspection and measurement of shape conformity in industrial production systems, digitization of clay models for industrial design and styling applications, reverse engineering of existing parts with complex geometry, interactive visualization of objects in multimedia applications, or three-dimensional documentation of artwork and artifacts.

A wide range of techniques exist for acquiring 3D data from an object. These techniques include using structured laser illumination or other controlled stimulus (such as x-rays, ultrasound, or magnetic resonance) to techniques that operate directly on video data captured from one or more cameras. Regardless of the particular sensing technology, a scanning process can be divided into abstract steps of incremental data capture, derivation of 3D data, and registration of the incremental data to a common 3D coordinate system. The final registration step brings the incremental data together into a single 3D model of a scan object.

SUMMARY

This disclosure may disclose, inter alia, methods and systems for determining three-dimensional (3D) object data models based on the movement of the 3D object.

In one example, a method is provided that includes receiving by a processor first scan data of an object within a space. The first scan data comprises: (i) a first position of the object in the space and (ii) a first mesh image defining a first view of a shape of the object at the first position. The method also includes receiving second scan data of the object that comprises: (i) movement information defining a movement of the object from the first position to a second position within the space and (ii) a second mesh image defining a second view of the shape of the object at the second position. The method additionally includes aligning the first scan data and the second scan data so as to generate a three-dimensional (3D) object data model of the object based on (i) the first mesh image that defines the first view of the shape of the object at the first position, (ii) the movement information, and (iii) the second mesh image that defines the second view of the shape of the object at the second position.

In another example, a system is provided that includes a computing device, a non-transitory computer-readable medium, and program instructions stored on the non-transitory computer-readable medium executable by the computing device to perform the functions of: receiving first scan data of an object within a space. The first scan data comprises: (i) a first position of the object in the space and (ii) a first mesh image defining a first view of a shape of the object at the first position. The functions also include receiving second scan data of the object that comprises: (i) movement information defining a movement of the object from the first position to a second position within the space and (ii) a second mesh image defining a second view of the shape of the object at the second position. The functions additionally include aligning the first scan data and the second scan data so as to generate a three-dimensional (3D) object data model of the object based on (i) the first mesh image that defines the first view of the shape of the object at the first position, (ii) the movement information, and (iii) the second mesh image that defines the second view of the shape of the object at the second position.

In another example, a non-transitory computer readable medium having stored therein instructions executable by a computing device to cause the computing device to perform functions is provided. The functions include receiving first scan data of an object within a space. The first scan data comprises: (i) a first position of the object in the space and (ii) a first mesh image defining a first view of a shape of the object at the first position. The functions also include receiving second scan data of the object that comprises: (i) movement information defining a movement of the object from the first position to a second position within the space and (ii) a second mesh image defining a second view of the shape of the object at the second position. The functions additionally include aligning the first scan data and the second scan data so as to generate a three-dimensional (3D) object data model of the object based on (i) the first mesh image that defines the first view of the shape of the object at the first position, (ii) the movement information, and (iii) the second mesh image that defines the second view of the shape of the object at the second position.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 3A-3D conceptually illustrate examples of determining a 3D object data model based on the movement of the object, in accordance with embodiments described herein.

FIG. 5 is a schematic illustrating a conceptual partial view of an example computer program product that includes a computer program for executing a computer process on a computing device, in accordance with embodiments described herein.

DETAILED DESCRIPTION

Figure 1:
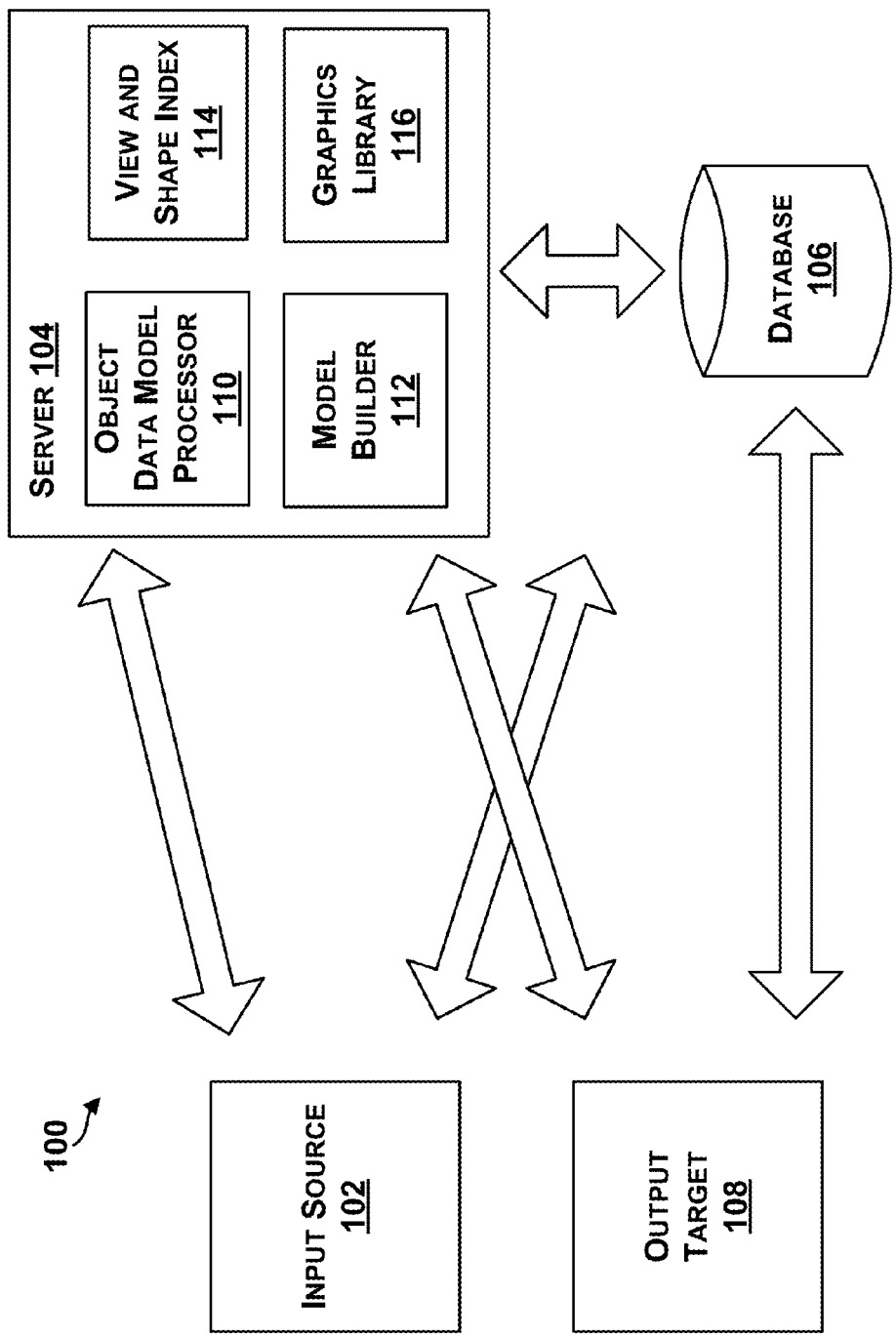
FIG. 1 is a diagram illustrating an example system for determining three-dimensional (3D) object data models based on the movement of an object, in accordance with embodiments described herein.

The following detailed description includes references to the accompanying figures. In the figures, similar symbols typically identify similar components, unless context dictates otherwise. The example embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

This disclosure may disclose, inter alia, methods and systems for determining three-dimensional (3D) object data models of an object based on the movement of the object. Known methods and techniques may exist for determining and creating 3D models of objects based on data representing the objects. In one example, different mesh images of an object may be positioned and aligned to create the 3D model of the object. In other examples, different scans of the object may be positioned and aligned to create the 3D model. Regardless of the specific type of data that may be used to create the 3D model, to complete the alignment requires sufficient data (e.g., imagery) to allow for appropriate positioning and aligning of the data to create the model. At times, however, sufficient data may be unobtainable. The data may have been scanned incomplete, or stored in an unrelated manner (e.g., stored without providing information as to how each image relates or correlates to the other stored images). Under both scenarios, the positioning and alignment of the data may be less accurate thereby inhibiting the creation of the 3D model. Accordingly, it may be useful to track the movement of an object in attempt to determine how different scan data of the object is related, as well as using the movement information to interpolate any missing scan data. The example methods and systems disclosed herein relate to tracking the movement of an object in attempt to help with the initial positioning of data used to create a 3D object model.

In one embodiment, a processor may receive first scan data of an object within in a space. The first scan data may comprise: (i) a first position of the object in the space and (ii) a first mesh image defining a first view of a shape of the object at the first position. The processor may also receive second scan data of the object that comprises: (i) movement information defining a movement of the object from the first position to a second position within the space and (ii) a second mesh image defining a second view of the shape of the object at the second position. The processor may additionally align the first scan data and the second scan data so as to generate a three-dimensional (3D) object data model of the object based on (i) the first mesh image that defines the first view of the shape of the object at the first position, (ii) the movement information, and (iii) the second mesh image that defines the second view of the shape of the object at the second position.

Referring now to the figures, FIG. 1 illustrates an example system 100 for determining 3D object data models based on the movement of an object. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which 3D object scan data may be received. In some examples, the 3D object scan data acquisition (movement, shape, appearance, and view) may be achieved by working with venders or manufacturers to scan an object in 3D at various angles and different positions. For instance, structured light scanners may capture images of the object and a shape of the object may be recovered using monochrome stereo cameras and a pattern projector. A video camera may be mounted on the scanner to capture structure-form motion data of the object as the object is moved by a user, for example. In further examples, a high-resolution digital single-lens reflex (DSLR) camera may be used to capture images as the object moves around on a turntable. In still other examples, a raw computer-aided drafting (CAD) set of drawings may be received for each object along with translation and/or rotation matrices and view information that defines the movement of the object and the view of the object associated with each drawing. Thus, the input source 102 may provide 3D object data, in various forms, to the server 104. As one example, multiple scans of the object from varying viewpoints may be processed into individual mesh images, and provided, along with a rotation matrix of the object, to the server 104 in that form.

The server 104 includes a model processor 110, an object data model builder 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The object data model processor 110 receives the 3D object scan data for each object from the input source 102 and generates triangulated mesh images, when necessary. For instance, the 3D object scan data that is received may be decimated (e.g., from 5 million to 120,000 surfaces) utilizing texture-preserving decimation.

The model builder 112 may also receive the 3D object scan data for each object from the input source 102, which may include a data set defining a mesh image of the object, and may align and generate an animated model of the object in 3D. In other examples, the model builder 112 may receive the processed 3D object scan data from the data model processer 112 and generate a 3D model of the object using the triangulated mesh images.

The view and shape image index 114 may receive captured data or processed data that represent or are related to the object on which the 3D object data model is based. For example, for each 3D object data model, the view and shape image index 114 may receive one or multiple mesh images of the object from different viewpoints and may index the mesh images as such. The view and shape image index 114 may also receive movement information for the corresponding 3D object scan data.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The database 106 may store all data sets for a 3D object data model in any number of various forms from raw data captured to processed data for display. For example, the database 106 may store various models of the 3D object data (shown in FIG. 3D).

The output target 108 may include a number of different targets, such as a webpage on the Internet, a search engine, a database, etc. The output target 108 may include a 3D object data model viewer that enables product advertisements or product searches based on the 3D object data model. In a further example, the output target 108 may include an HTML webpage that displays multiple rendered images of the 3D object data model in the form of advertisements. In operation, for example, the output target 108 may receive from the database 106 the 3D object data model for display in a 3D object data model viewer.

In examples herein, the system 100 may be used to acquire 3D object scan data of an object as it moves and process the data to generate an accurate 3D object data model for display in a 3D object data model viewer.

Figure 2:
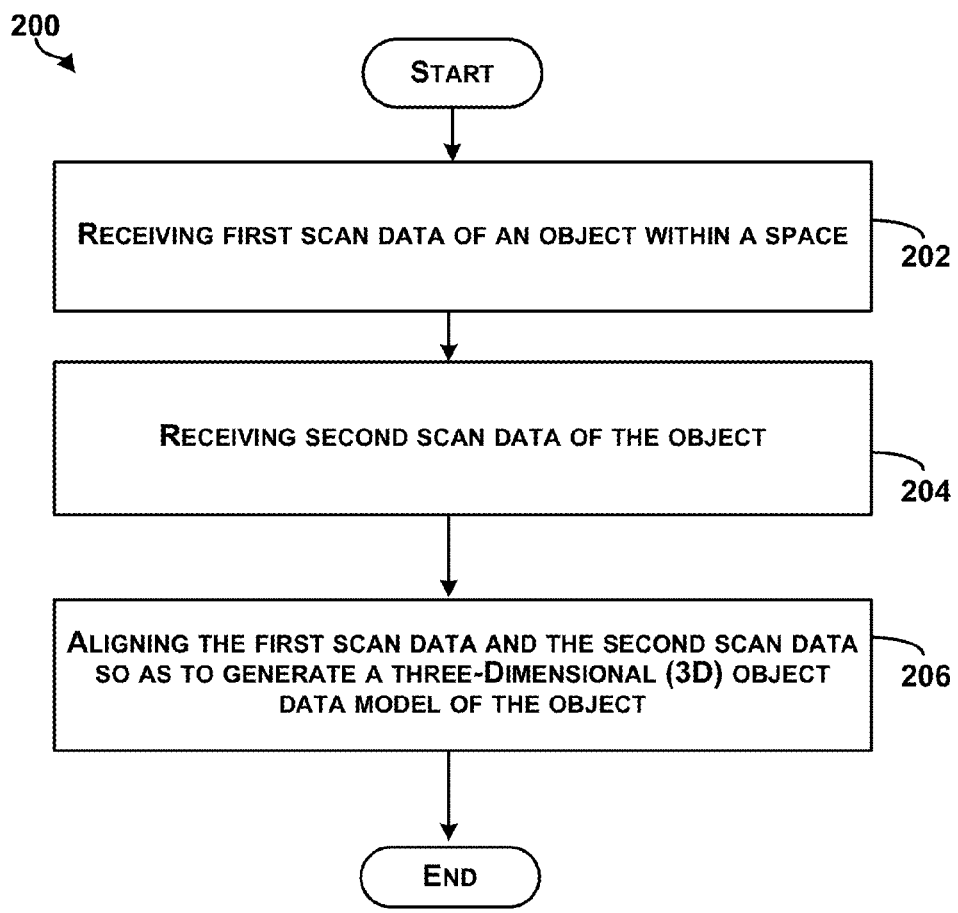
FIG. 2 is a block diagram of an example method for determining 3D object data models based on the movement of the object, in accordance with embodiments described herein.

FIG. 2 is a block diagram of an example method for determining 3D object data models based on object movement. Method 200 shown in FIG. 2 presents an embodiment of a method that, for example, could be used with the system 100, and may be performed by a device such as any of the components illustrated in FIG. 1. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium or memory, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes receiving first scan data of an object within a space. The space may comprise a 3D coordinate system. A server or other computing device may receive the first scan data of the object from a number of sources, such as input by a user, from a scanner, from another server, or database, for example.

The first scan data may comprise: (i) a first position of the object in the space and (ii) a first mesh image defining a first view of a shape of the object at the first position. The first position of the object may, for example, be at the top of a coordinate system defining the space, at the bottom of the coordinate system, or in the middle of the coordinate system, and may be a coordinate defining a point in the center of the object. In other examples, the first position may be any other coordinate defining a point on the object used to indicate the first position of the object in the coordinate system. The first mesh image may comprise a collection of vertices, edges, and faces that define the shape of the object and may depict the object from varying angles. For instance, the mesh image may depict a view from the bottom of the coordinate system directed upwards toward the object. In other examples, the mesh image may depict a different view (e.g., shown in FIG. 3A). The first scan data may also comprise other data representations of the object such as a DSLR image of the object depicting the object from varying angles, all of which are contemplated herein.

In further examples, the first scan data may comprise non-rigid movement information defining a deformable surface area of the object. The deformable surface area may be deformed independent of the movement of the object. The non-rigid movement information may comprise coordinates in the coordinate system relative to the first position of the object in the space.

For example, the first scan data may comprise a mesh image of a bear with two arms and two legs. The arms and legs of the bear may be deformed without moving the bear in its entirety. For instance, the bear may be held still and the arm of the bear may be stretched upward. In other examples, the legs may be squashed without movement of the arms or the bear in its entirety. The non-rigid movement information may comprise, for example, coordinates that define the location of the deformable arm on the mesh image of the bear.

At block 204, the method 200 includes receiving second scan data of the object. The second scan data may comprise: (i) movement information defining a movement of the object from the first position to a second position within the space and (ii) a second mesh image defining a second view of the shape of the object at the second position. The movement of the object may occur by user control of the object or automatically. For example, system 100 may automatically operate a motorized arm to move the object to a desired position or elevation. In other examples, the object may be moved using a turntable. The movement of the object may comprise a translation, a rotation, or a warp of the object, for example. In other examples, the movement of the object may comprise an angulation of the object. The server 104 may receive movement information defining one or more of the translation, the rotation, the angulation, and the warp from the input 102. Similar to the first mesh image, the second mesh image may comprise a collection of vertices, edges, and faces that define the shape of the object and may depict the object from varying angles.

The movement information may comprise a movement coordinate that defines the second position of the object. Using the first position coordinate of the first scan data, the movement coordinate of the second scan data, the angle of the first mesh image, and the angle of the second mesh image, a translation matrix and/or a rotation matrix may be determined. In other examples, a technique can be implemented to track the movement of a coordinate on the object in real-time. A particular coordinate on the object may be selected by a user, for example, for tracking. As the object is moved the object may be tracked and, the movement information may be used to determine a feature point motion map defining the movement of the particular coordinate on the object. One or more coordinates may be selected for tracking.

In further examples, the second scan data may comprise non-rigid movement information that defines the deformation of the deformable surface area of the object within the space. Continuing with the bear example above, the second scan data may comprise a deformation matrix that defines the deformation of the arm of the bear.

At block 206, the method 200 includes aligning the first scan data and the second scan data so as to generate a three-dimensional (3D) object data model of the object. The first scan data and the second scan data may be aligned based on (i) the first mesh image that defines the first view of the shape of the object at the first position, (ii) the movement information, and (iii) the second mesh image that defines the second view of the shape of the object at the second position. The 3D object data model may be generated, for example, by aligning the first mesh image and the second mesh image (e.g., shown in FIG. 3B) using the translation matrix and/or rotation matrix to position the mesh images together for alignment. In other examples, the 3D object data model may be generated by aligning the first mesh image and the second mesh image using a feature point motion map (e.g., shown in FIG. 3C) of the object by tracking the movement of the object in real time so as to position the first mesh image and the second mesh image together for alignment. In further examples, the 3D object data model may be generated, for example, by aligning the first mesh image and the second mesh image using a deformation matrix so as to further position the first mesh image of the data representation and the second mesh image of the second data representation for alignment. The deformation matrix may be determined using the non-rigid movement information and/or the deformation information.

Using the first scan data and the second scan data in this manner may (1) allow the data (e.g., the first mesh image and the second mesh image) to be better positioned for alignment to create the 3D object model, and (2) allow any missing data to be interpolated based on the correctly positioned data. For example, creation of a 3D object model representing a shoe can be performed by tracking movement of the shoe, and using the movement information to position mesh images of the shoe together for alignment. The movement information may be captured along with alternate views of the object (e.g., a top view and side view and capturing rotation or translation matrices representing movement from the top view to the side view), and any incomplete data may be interpolated based on the captured data. This positioning may help ensure the aligning process is more accurate.

Once the scan data has been positioned (e.g., the first mesh image and the second mesh image) using the movement information, alignment of the data may be performed. In many systems the alignment of the 3D object data model may be performed manually. The alignment can be refined automatically using techniques such as the Iterative Closest Point (ICP) algorithm of Besl and McKay (See, "A method for registration of 3-D shapes"; by Besl, P. J. and McKay, H. D. in Patten Analysis and Machine Intelligence, IEEE Transactions, Vol. 14, Issue 2, February 1992, pp. 239-256) and Chen and Medioni (See, "Object modeling by registration of multiple range images"; Y. Chen and G. Medioni, Proc. IEEE Conf. on Robotics and Automation, 1991), or the Non-rigid range-scan alignment of Brown and Rusinkiewicz (See "Non-rigid range-scan alignment using thin-plate splines"; by Brown, B. J. and Rusinkiewicz, S. in Proc. IEEE 3D Data Processing, Visualization and Transmission, pp. 759-765, 2004), which are both known the art.

The ICP algorithm iteratively establishes point correspondences given the current alignment of scanned data and computes a rigid transformation. More specifically, the ICP algorithm is employed to minimize the difference between two clouds of points. The clouds of points may be obtained from multiple scans of an object, for example. In operation, the ICP algorithm iteratively revises, in real time, the rigid transformation (i.e., translation and rotation) needed to minimize the distance between the points of the different scans. In other words, the ICP algorithm repeatedly establishes points on one or both scans (e.g., mesh images of a 3D object) finding closest points on the other respective scan, and computes the rigid body transformation that minimizes the least squares error between the two point sets.

The Non-rigid range-scan alignment algorithm is a variant of the ICP algorithm and is employed to reconstruct non-rigid deformations. Such deformations may include deformations applied to a deformable object, or deformations caused by scanning device nonlinearities or calibration error. To achieve this, the algorithm first obtains sparse correspondences between scan views using a locally weighted, stability-guaranteeing variant of the ICP. Global positions for feature points are found (a common set of features on all scans) using a relaxation method, and the scans are warped to their final positions using thin-plate spines. Thin-plate spine warp is a widely known smoothing function used for modeling coordinate transformations.

In one example, the object data model processor 110 may execute instructions to run an application that performs the ICP technique on the mesh images of the first scan data and the mesh images of the second scan data after the mesh images are positioned. The generated 3D object model may then be stored in the database 106 and displayed at the output target 108. In another example, a plurality of generated 3D object data models may be provided to the database 106. Any structuring technique may be used by the processor 110 to render the 3D data object model for display at the output target 108.

Figure 3A:
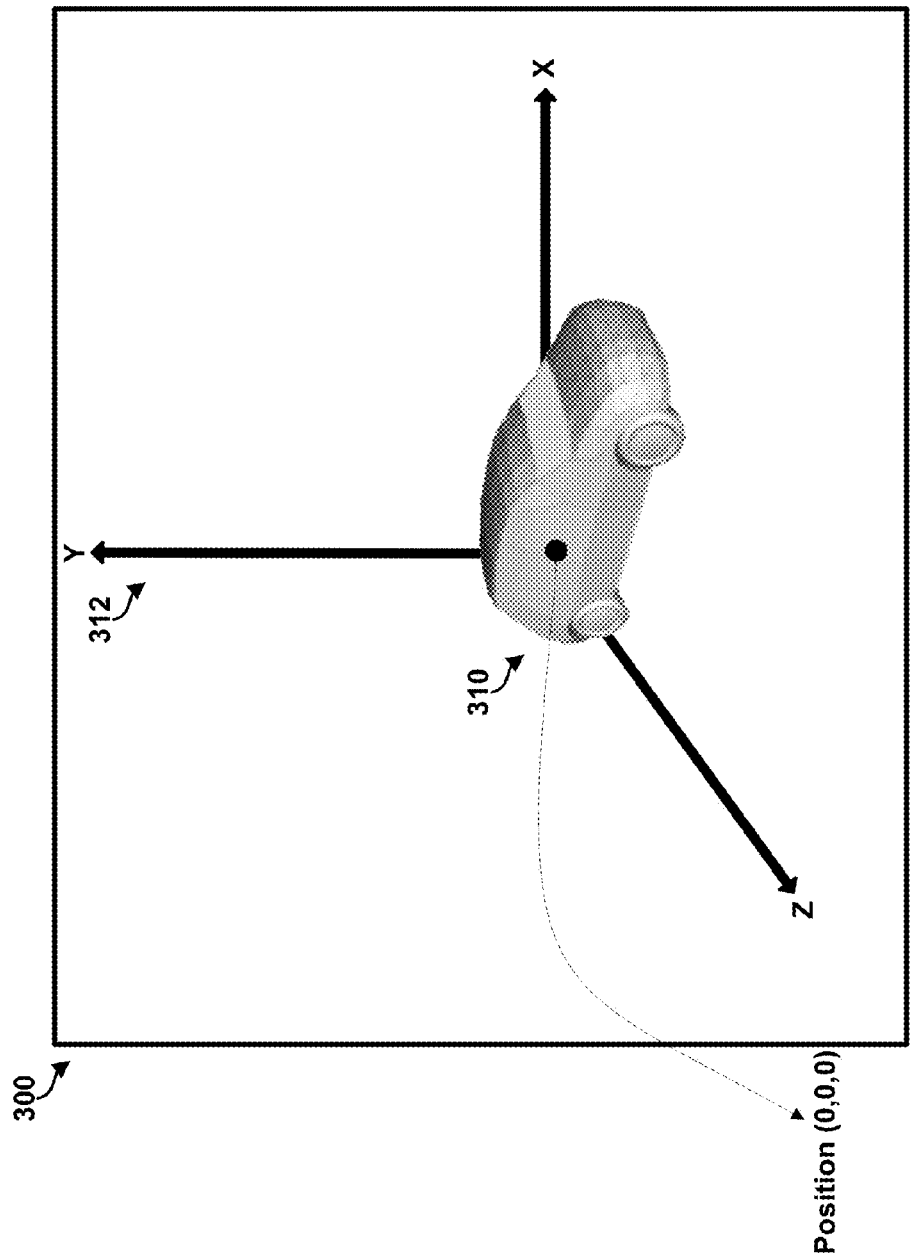

FIGS. 3A-3D conceptually illustrate examples of receiving first scan data of an object within a space, receiving second scan data of the object that comprises movement information defining a movement of the object, and processing the first scan data and the second scan data so as to generate a 3D object data model of the object. FIG. 3A represents first scan data 310 of a car (i.e., object) within a space 300. The space 300 comprises a coordinate system 312, and the car is depicted from a first view.

FIG. 3B illustrates second scan data 314-318 of the car within the space 300. As shown the data comprises mesh images of the car based on its movement throughout the space 300. The second scan data comprises a second view (e.g., 314-318) of the car 310. Moreover, the second scan data includes movement data. For example, each data set might have a position coordinate, a rotation matrix and a translation matrix defining the movement of the car. For example, the car may be moved straight up from its original position (i.e., translation) and rotated ninety degrees to the right (rotation) in space 300 and obtained as second scan data 314.

FIG. 3C illustrates another embodiment of second scan data 320 of the car within the space 300. As shown the data comprises images of the car based on its movement throughout the space 300. The scan data also includes feature points 322 that track the movement of the car as it moves throughout the space.

Figure 3D:
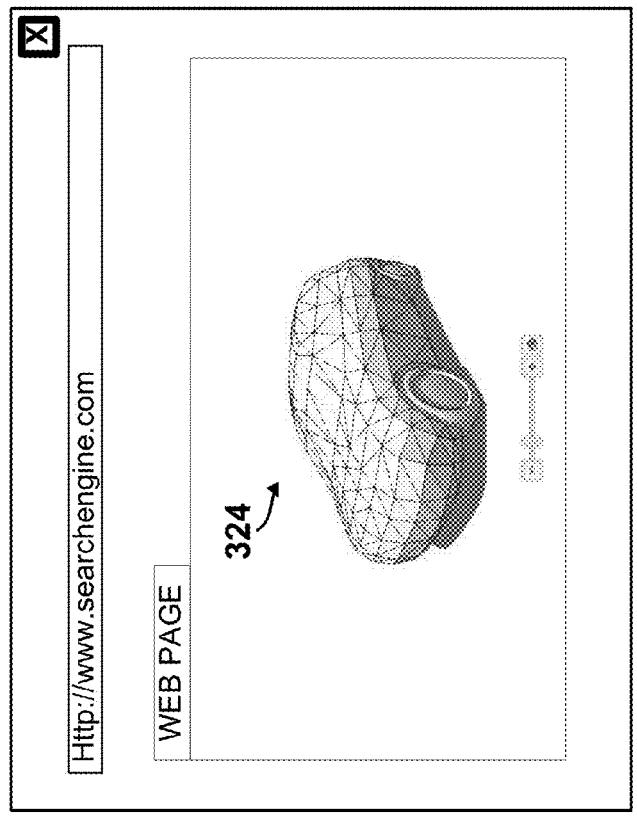

FIG. 3D illustrates an example of a 3D object data model 324 of the car 310 being displayed in a 3D object model viewer or HTML web page, for example. As shown a complete 3D object model may be created based on the first scan data 310 and the second scan data 314-322 of the car, for example.

Figure 3D:
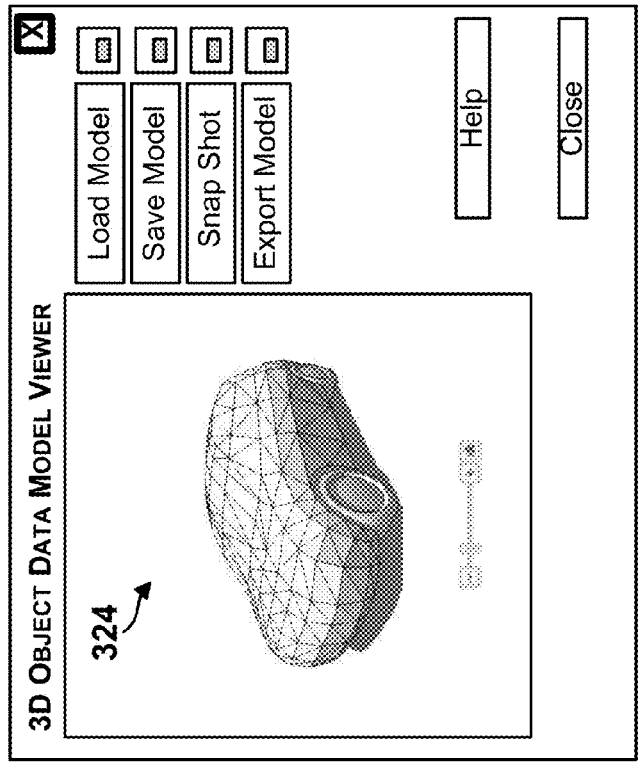
Figure 4:
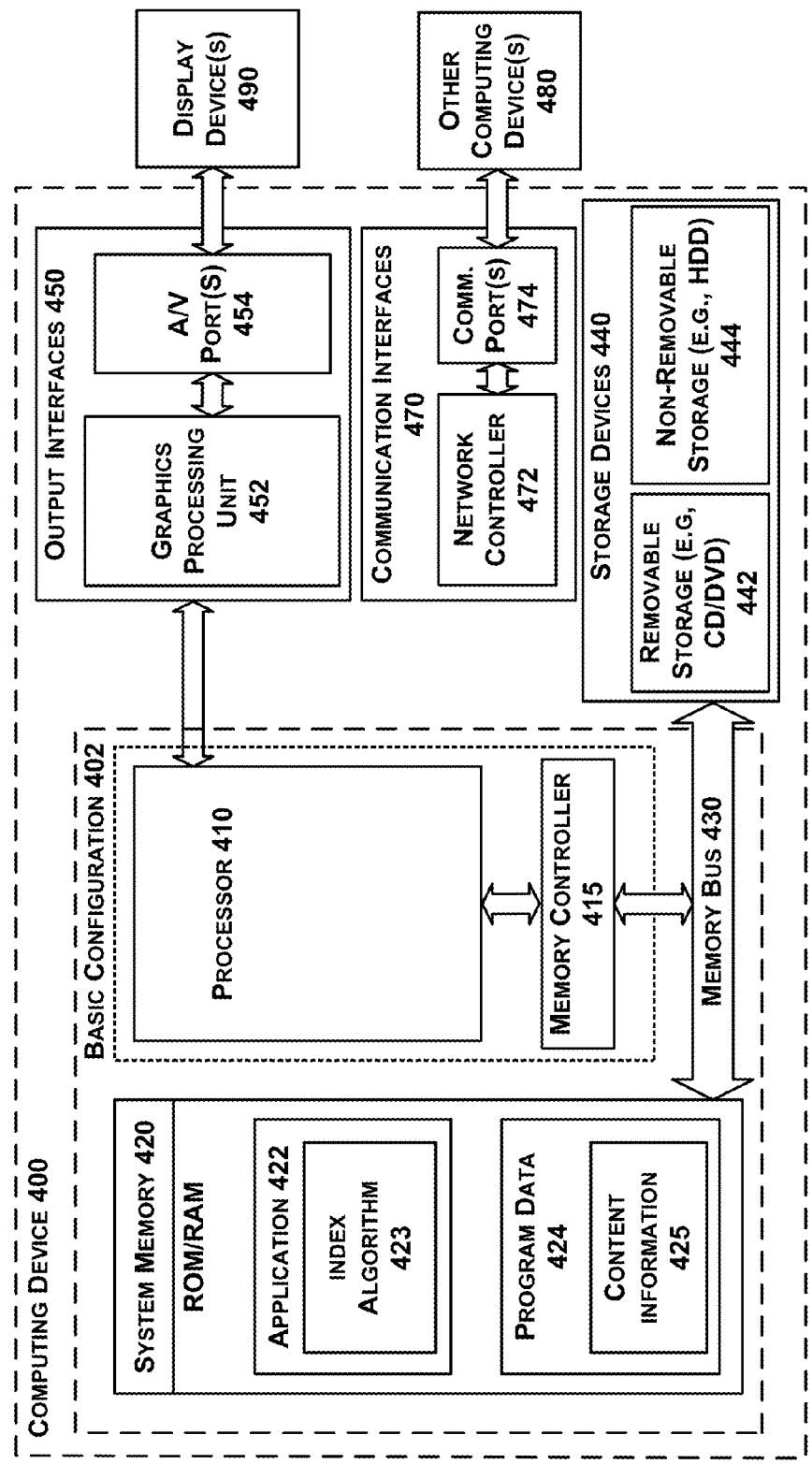
FIG. 4 is a functional block diagram illustrating an example computing device used in a computing system, in accordance with embodiments described herein.

FIG. 4 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for interacting with 3D object data models as described in FIGS. 1-3. In a basic configuration 402, computing device 400 may typically include one or more processors 410 and system memory 420. A memory bus 430 can be used for communicating between the processor 410 and the system memory 420. Depending on the desired configuration, processor 410 can be of any type including but not limited to a microprocessor (µP), a microcontroller (µC), a digital signal processor (DSP), or any combination thereof. A memory controller 415 can also be used with the processor 410, or in some implementations, the memory controller 415 can be an internal part of the processor 410.

Depending on the desired configuration, the system memory 420 can be of any type including but not limited to volatile memory (such as RAM), non-volatile memory (such as ROM, flash memory, etc.) or any combination thereof. System memory 420 may include one or more applications 422, and program data 424. Application 422 may include an index algorithm 423 that is arranged to provide inputs to the electronic circuits, in accordance with the present disclosure. Program data 424 may include content information 425 that could be directed to any number of types of data. In some example embodiments, application 422 can be arranged to operate with program data 424 on an operating system.

Computing device 400 can have additional features or functionality, and additional interfaces to facilitate communications between the basic configuration 402 and any devices and interfaces. For example, data storage devices 440 can be provided including removable storage devices 442, non-removable storage devices 444, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 420 and storage devices 440 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400.

Computing device 400 can also include output interfaces 450 that may include a graphics processing unit 452, which can be configured to communicate to various external devices such as display devices 490 or speakers via one or more A/V ports or a communication interface 470. The communication interface 470 may include a network controller 472, which can be arranged to facilitate communications with one or more other computing devices 480 over a network communication via one or more communication ports 474. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 501. The signal bearing medium 501 may include one or more programming instructions 502 that, when executed by one or more processors may provide functionality or portions of the functionality described above with respect to FIGS. 1-3. In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming with the IEEE 802.11 standard or other transmission protocol).

The one or more programming instructions 502 may be, for example, computer executable and/or logic implemented instructions. In some examples, a computing device such as the computing device 400 of FIG. 4 may be configured to provide various operations, functions, or actions in response to the programming instructions 502 conveyed to the computing device 500 by one or more of the computer readable medium 503, the computer recordable medium 504, and/or the communications medium 505.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
receiving, by a processor, first scan data of an object within a space, wherein the first scan data comprises: (i) a first position of the object in the space, (ii) a first two-dimensional mesh image defining a first view of a shape of the object at the first position, and (iii) non-rigid movement information defining a deformable surface area of the object, wherein the non-rigid movement information comprises coordinates in a coordinate system that define a location of the deformable surface area on the object and are relative to the first position of the object in the space; and
receiving second scan data of the object that comprises: (i) movement information defining a movement of the object from the first position to a second position within the space, (ii) a second two-dimensional mesh image defining a second view of the shape of the object at the second position, and (iii) deformation information that defines a deformation of the deformable surface area of the object at the second position within the space, wherein the deformable surface area is deformable independent of the movement of the object; and
aligning the first scan data and the second scan data so as to generate a three-dimensional (3D) object data model of the object based on (i) the first two-dimensional mesh image that defines the first view of the shape of the object at the first position, (ii) the movement information, (iii) the second two-dimensional mesh image that defines the second view of the shape of the object at the second position, and (iv) the deformation information.

2. The method of claim 1, wherein the movement comprises one or more of a translation, a rotation, an angulation, and a warp of the object.

3. The method of claim 1, wherein the first position of the object comprises a position coordinate in the coordinate system that defines the first position of the object and the movement information comprises a movement coordinate in the coordinate system that defines the second position of the object.

4. The method of claim 3, wherein:
the first two-dimensional mesh image is at a first angle;
the first two-dimensional mesh image comprises a collection of vertices, edges, and faces that define the first view of the shape of the object at the first position;
the second two-dimensional mesh image is at a second angle; and
the second two-dimensional mesh image comprises a collection of vertices, edges, and faces that define the second view of the shape of the object at the second position.

5. The method of claim 4, wherein aligning the first scan data and the second scan data so as to generate a three-dimensional (3D) object data model of the object based on (i) the first two-dimensional mesh image that defines the first view of the shape of the object at the first position, (ii) the movement information, (iii) the second two-dimensional mesh image that defines the second view of the shape of the object at the second position, and (iv) the deformation information comprises:
aligning the first two-dimensional mesh image and the second two-dimensional mesh image using one or more of a translation matrix, a rotation matrix, and a deformation matrix, wherein the translation matrix and the rotation matrix are determined using one or more of the position coordinate, the movement coordinate, the first angle, and the second angle, and wherein the deformation matrix is determined using the non-rigid movement information.

6. The method of claim 4, wherein aligning the first scan data and the second scan data so as to generate a three-dimensional (3D) object data model of the object based on (i) the first two-dimensional mesh image that defines the first view of the shape of the object at the first position, (ii) the movement information, (iii) the second two-dimensional mesh image that defines the second view of the shape of the object at the second position, and (iv) the deformation information comprises:
aligning the first two-dimensional mesh image and the second two-dimensional mesh image using a feature point motion map of the object, wherein the feature point motion map is determined by tracking the movement of the object in real time.

7. A system comprising:
a computing device;
a non-transitory computer-readable medium; and
program instructions stored on the non-transitory computer-readable medium and executable by the computing device to perform the functions of:
receiving first scan data of an object within a space, wherein the first scan data comprises: (i) a first position of the object in the space, (ii) a first two-dimensional mesh image defining a first view of a shape of the object at the first position, and (iii) non-rigid movement information defining a deformable surface area of the object, wherein the non-rigid movement information comprises coordinates in a coordinate system that define a location of the deformable surface area on the object and are relative to the first position of the object in the space;
receiving second scan data of the object that comprises: (i) movement information defining a movement of the object from the first position to a second position within the space, (ii) a second two-dimensional mesh image defining a second view of the shape of the object at the second position, and (iii) deformation information that defines a deformation of the deformable surface area of the object at the second position within the space, wherein the deformable surface area is deformable independent of the movement of the object; and aligning the first scan data and the second scan data so as to generate a three dimensional (3D) object data model of the object based on (i) the first two-dimensional mesh image that defines the first view of the shape of the object at the first position, (ii) the movement information, (iii) the second two dimensional mesh image that defines the second view of the shape of the object at the second position, and (iv) the deformation information.

8. The system of claim 7, wherein the movement comprises one or more of a translation, a rotation, an angulation, and a warp of the object.

9. The system of claim 7, wherein:
the first position of the object comprises a position coordinate in the coordinate system that defines the first position of the object;
the movement information comprises a movement coordinate in the coordinate system that defines the second position of the object;
the first two-dimensional mesh image is at a first angle;
the second two-dimensional mesh image is at a second angle;
the first two-dimensional mesh image comprises a collection of vertices, edges, and faces that define the first view of the shape of the object at the first position; and
the second two-dimensional mesh image comprises a collection of vertices, edges, and faces that define the second view of the shape of the object at the second position.

10. The system of claim 9, wherein the function of aligning the first scan data and the second scan data so as to generate a three-dimensional (3D) object data model of the object based on (i) the first two-dimensional mesh image that defines the first view of the shape of the object at the first position, (ii) the movement information, (iii) the second two-dimensional mesh image that defines the second view of the shape of the object at the second position, and (iv) the deformation information comprises:
aligning the first two-dimensional mesh image and the second two-dimensional mesh image using one or more of a translation matrix, a rotation matrix, and a deformation matrix, wherein the translation matrix and the rotation matrix are determined using one or more of the position coordinate, the movement coordinate, the first angle, and the second angle, and wherein the deformation matrix is determined using the non-rigid movement information.

11. The system of claim 9, wherein the function of aligning the first scan data and the second scan data so as to generate a three-dimensional (3D) object data model of the object based on (i) the first two-dimensional mesh image that defines the first view of the shape of the object at the first position, (ii) the movement information, (iii) the second two-dimensional mesh image that defines the second view of the shape of the object at the second position, and (iv) the deformation information comprises:
aligning the first two-dimensional mesh image and the second two-dimensional mesh image using a feature point motion map, wherein the feature point motion map is determined by tracking the movement of the object in real time.

12. A non-transitory computer-readable medium having stored therein instructions executable by a computing device to cause the computing device to perform functions comprising:
receiving first scan data of an object within a space, wherein the first scan data comprises: (i) a first position of the object in the space, (ii) a first two-dimensional mesh image defining a first view of a shape of the object at the first position, and (iii) non-rigid movement information defining a deformable surface area of the object, wherein the non-rigid movement information comprises coordinates in a coordinate system that define a location of the deformable surface area on the object and are relative to the first position of the object in the space;
receiving second scan data of the object that comprises: (i) movement information defining a movement of the object from the first position to a second position within the space, (ii) a second two-dimensional mesh image defining a second view of the shape of the object at the second position, and (iii) deformation information that defines a deformation of the deformable surface area of the object at the second position within the space, wherein the deformable surface area is deformable independent of the movement of the object; and
aligning the first scan data and the second scan data so as to generate a three-dimensional (3D) object data model of the object based on (i) the first two-dimensional mesh image that defines the first view of the shape of the object at the first position, (ii) the movement information, (iii) the second two-dimensional mesh image that defines the second view of the shape of the object at the second position, and (iv) the deformation information.

13. The non-transitory computer readable medium of claim 12, wherein the movement comprises one or more of a translation, a rotation, an angulation, and a warp of the object.

14. The non-transitory computer readable medium of claim 12, wherein:
the first position of the object comprises a position coordinate in the coordinate system that defines the first position of the object;
the movement information comprises a movement coordinate in the coordinate system that defines the second position of the object;
the first two-dimensional mesh image is at a first angle;
the second two-dimensional mesh image is at a second angle;
the first two-dimensional mesh image comprises a collection of vertices, edges, and faces that define the shape of the object at the first view; and
the second two-dimensional mesh image comprises a collection of vertices, edges, and faces that define the shape of the object at the second view.

15. The non-transitory computer readable medium of claim 12, wherein the instructions are further executable by the computing device to cause the computing device to perform functions comprising:
aligning the first two-dimensional mesh image and the second two-dimensional mesh image using one or more of a translation matrix, a rotation matrix, and a deformation matrix, wherein the translation matrix and the rotation matrix are determined using one or more of the position coordinate, the movement coordinate, the first angle, and the second angle, and wherein the deformation matrix is determined using the non-rigid movement information; and
aligning the first two-dimensional mesh image and the second two-dimensional mesh image using a feature point motion map of the object, wherein the feature point motion map of the object is created by tracking the movement of the object in real time.

* * * * *